Feb. 3, 1970 W. E. LEVINE 3,492,877
CRYSTAL MOUNT FOR CONDITION RESPONSIVE INSTRUMENT
Original Filed Feb. 5, 1965 3 Sheets-Sheet 2

INVENTOR.
WALTER E. LEVINE
BY Daniel Rubin
ATTORNEYS

INVENTOR.
WALTER E. LEVINE
ATTORNEY

3,492,877
Patented Feb. 3, 1970

---

3,492,877
CRYSTAL MOUNT FOR CONDITION
RESPONSIVE INSTRUMENT
Walter Eli Levine, Hamden, Conn., assignor to Dresser
Industries, Inc., Stratford, Conn., a corporation of
Delaware
Original application Feb. 5, 1965, Ser. No. 430,712, now
Patent No. 3,386,411, dated June 4, 1968. Divided and
this application Aug. 22, 1967, Ser. No. 671,522
Int. Cl. G01p 1/02
U.S. Cl. 73—431                                     5 Claims

ABSTRACT OF THE DISCLOSURE

Crystal mounting structure for an indicating condition responsive instrument suitable for use in explosion susceptible atmosphere. The mounting structure is centrally secured to the crystal by means which include a threaded sleeve element passing through the crystal. A nut which is tightenable on the sleeve sealingly clamps the crystal at its periphery against an annular rearwardly facing seat provided by the instrument housing.

---

This is a division of application Ser. No. 430,712, filed Feb. 5, 1965 now U.S. Patent 3,386,411.

This invention relates to improvements in the construction of devices of the type actuated by changes in fluid pressure and operative in an explosion susceptible atmosphere, in turn, controlling associated devices.

The objects include that of providing in such a device an explosion proof housing, to establish a fluid pressure seal between the housing and a transparent crystal forming a part thereof, to lock the operating mechanism in the housing to prevent undesired displacement and to provide a locking mechanism for a control element which is used to set the upper and lower limits of the operating range of the device.

The exact nature of the constructions employed to accomplish these objectives are illustrated in full detail in a preferred embodiment appearing in the accompanying drawings.

The particular form of the invention comprises a device which is operated by changes in pressure of a fluid such as a gas, by converting the movements of a pressure distortable spring, such as a Bourdon spring, into forces for actuating, in this case, an electric switch of the mercury type, as will appear hereinafter to those skilled in the art. The subject matter comprising the invention herein disclosed is not limited in its use to this particular form of device.

Figure 2:
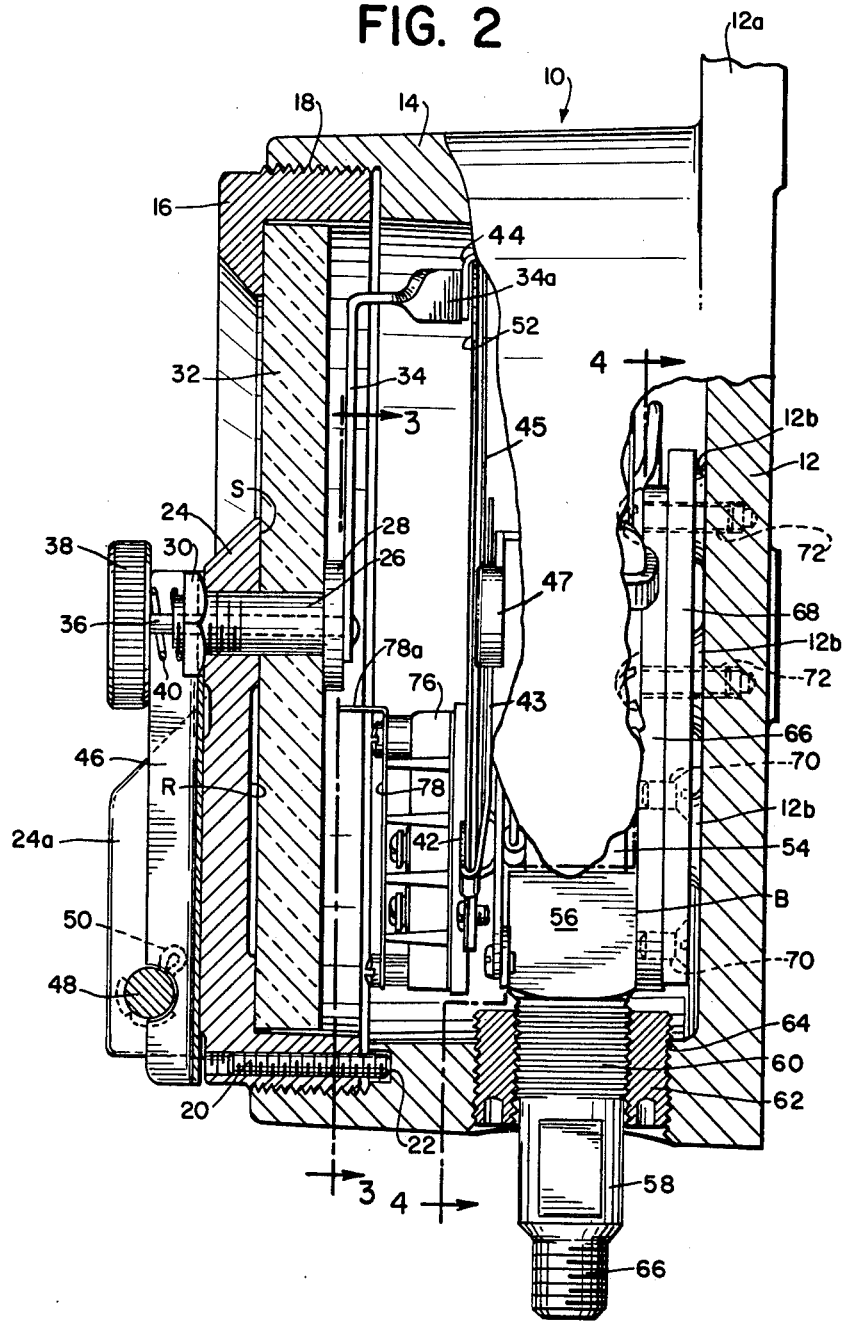
FIGURE 2 is a side elevational view of the structure of FIGURE 1, with much of the housing broken away to show parts in cross section.

As illustrated, the device 10 includes a heavy, preferably metal, casing consisting of a rear wall 12, see FIG. 2, having radially projecting ears 12a for attachment to any supporting member and an integral annular wall 14 forming a compartment for the actuating mechanism. The open side of the annular wall 14 is counterbored and internally threaded at 18 to receive a heavy ring 16, likewise, preferably of metal, which is externally threaded for engagement with the threads 18. As illustrated, in FIG. 2, the ring 16, when rotated to final position, may be locked in that position by means of a threaded Allen screw 20, which engages in a recess 22 in the wall 14.

Figure 1:
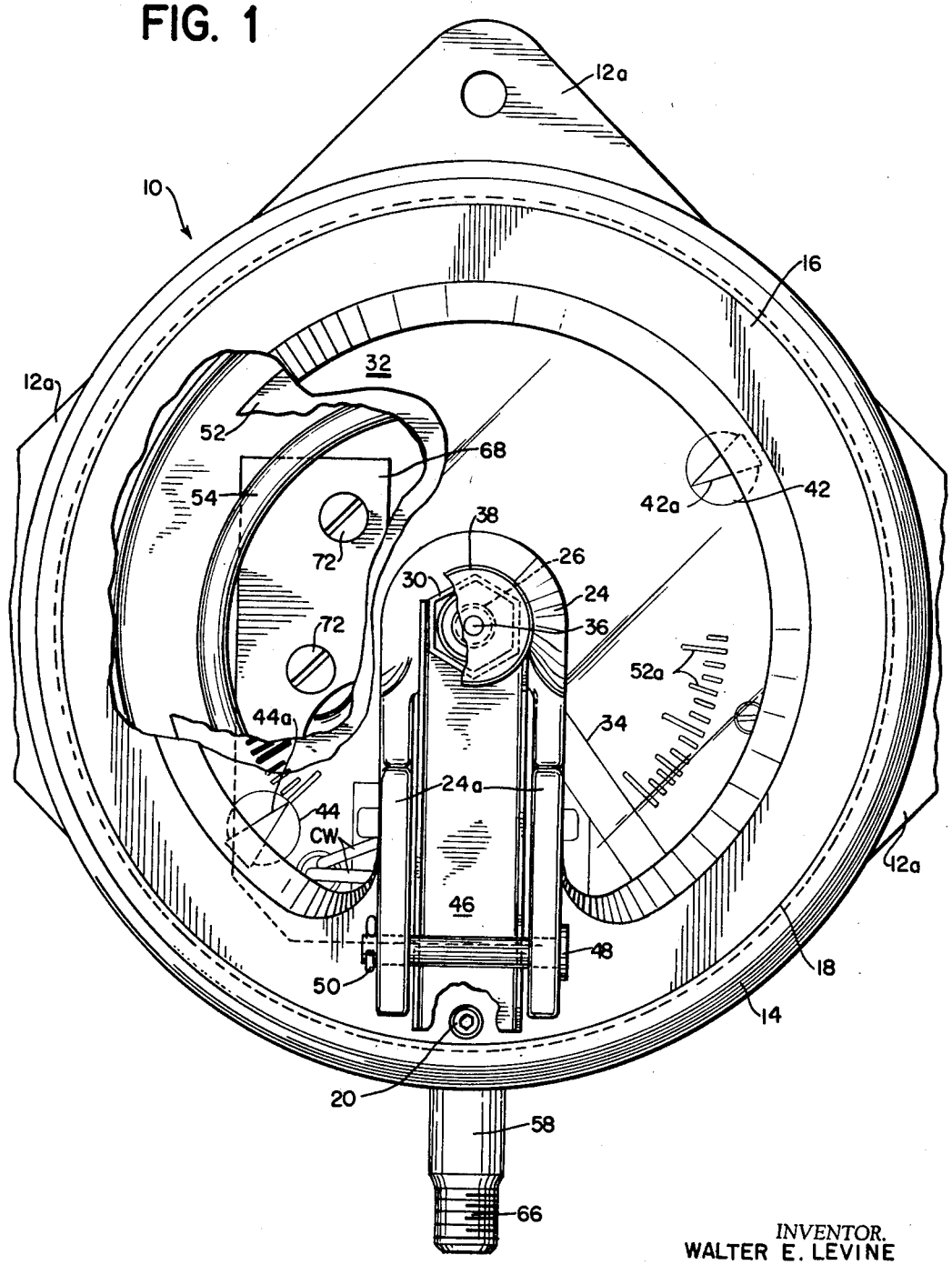
FIGURE 1 is a front elevational view of a control device in accordance with this invention, with some parts broken away for better illustrative purposes.

As can be seen from FIGS. 1 and 2 the heavy ring 16 is provided with an integral radially extending arm 24, in which is supported in an aperture a sleeve 26. The sleeve is provided with a head 28 and its opposite end is threaded to receive a clamping nut 30.

A transparent disk or crystal 32 of suitable glass, for example, is firmly held on an annular seat formed on the inner face of the ring 16 by means of the sleeve 26, which passes through a central aperture in the crystal and through a hole in the arm 24. When the nut 30 is applied under pressure it will clamp the crystal against the annular seat on the ring 16 and will slightly bow it outwardly to produce a very effective fluid pressure seal at the annular seat. The arm 24 is relieved between the seat at its free end, as shown at R in FIGURE 2. The plane of the seat S at the end of the arm 24 is slightly to the left of the plane of the annular seat on the ring, see FIG. 2, so that when the nut 30 is drawn up the glass 32 will be sprung outwardly or made to take a slightly domed shape in the central region, thereby greatly increasing the pressure between it and its annular face which overlaps the annular seat on the ring.

The sleeve 26 has a central bore in which a rotatable shaft 36 is mounted. Secured to the inner end of the shaft is an arm 34 having an axially extending terminal finger 34a, which lies close to the face of the dial 52. The other end of the shaft 36 is provided with a knurled finger knob 38 and a compression spring 40 is interposed by the knob 38 and the nut 30 so that the arm 34 is normally held spaced from the dial 52. When the knob 38 is pushed arm 34 is shifted, so that its terminal extension 34a will be moved close to the face of the dial 52, so as to be engageable with the terminal ends 42 and 44 of a pair of levers pivotally mounted behind the dial. The ends 42 and 44 are provided with pointed indicia 42a and 44a cooperating with the scale 52a on the dial. Thus, the two levers which terminate in the disks 42 and 44 can each be independently shifted with respect to the dial graduations by rotating the knob 38 with the lever 34 pushed inwardly, so that its end 34a can independently engage those disks. The levers which terminate in those disks adjust the mechanism in the housing for minimum and maximum control limits, that is, provide a range of control terminating at its limits so that the operating mechanism of the device can actuate in this case a mercury switch, not shown, to each of two positions. This actuation occurs at each end of the range. This operating mechanism forms no part of this invention, being the subject matter of a co-pending application. As soon as the pressure on the knob 38 is released, the arm 34 will be moved back to the position shown in FIG. 2 by the spring 40, whereupon the arm 34 can be rotated to an inactive position. This position is indicated in FIG. 1 and will be referred to later.

In order to make this device tamper-proof, that is, to prevent unauthorized shifting of the levers connected to the disks 42 and 44, a locking arrangement is provided to hold the arm 34 in a retracted position, preferably that shown in FIG. 1. As will be seen from FIGS. 1 and 2, the arm 24 is provided with a pair of raised sides 24a forming a channel in which a locking bar 46 can be positioned. This locking bar, as illustrated, is in the form of a thin metal channel which can be slid in between the raised sides 24a so that its inner end passes in back of the knob 38. The end of the bar 46 is notched to fit around the nut 30, see FIG. 1, and when seated can be locked in that position by means of a pin 48, which passes through the raised sides 24a of the arm 24. This pin can be held in that position by means of a cotter pin 50 or, if desired, a key actuated lock can be used. With the locking bar positioned, as shown in FIGS. 1 and 2, the knob 38 cannot be pushed inwardly and if the bar fits tightly enough the knob cannot even be turned.

Figure 4:
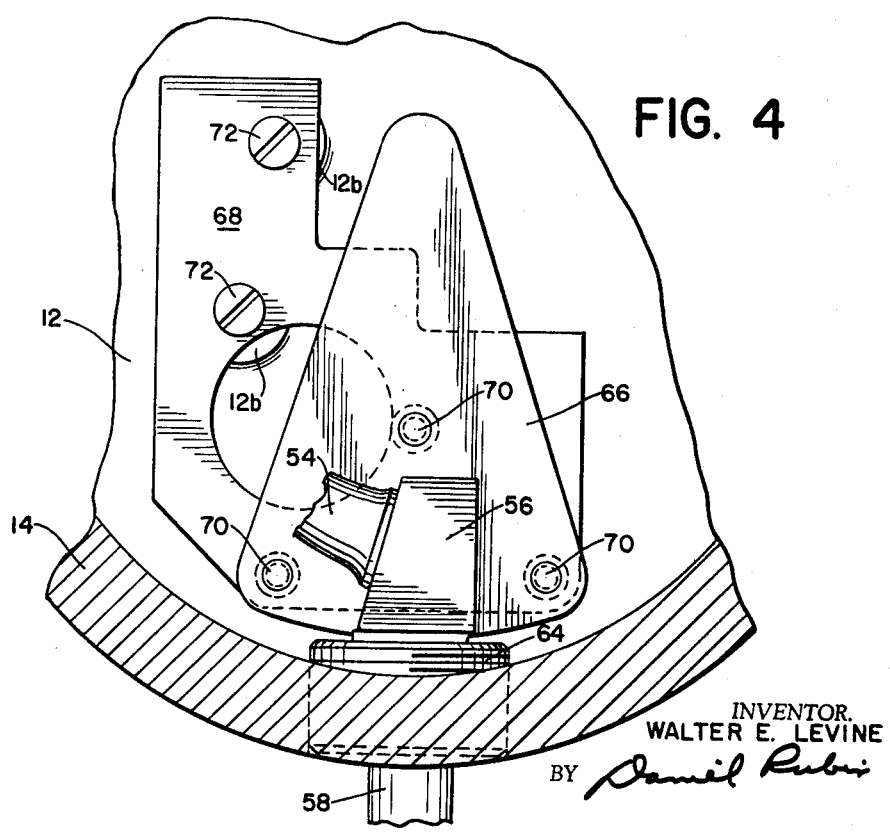
FIGURE 4 is a similar view as it would appear from line 4—4 of FIGURE 2.

For descriptive purposes, reference is made to the Bourdon spring 54, the interior of which is in communication with a coupler. This coupler comprises a pipe 58 having a threaded free end for connection to the source of pressure fluid and external threads 60 for mounting in the internally threaded sleeve 62, and a terminal head 56. The tube 58 and the head 56 have a passage therethrough and the Bourdon spring 54 is connected to the head 56, see FIG. 4, so that pressure fluid can be fed into the spring. This part of the structure is conventional. However, the sleeve 62 is externally threaded so that it can be screwed into a threaded opening 64 in the wall 14 of the housing, see FIG. 2.

Secured in any suitable manner, as by brazing or welding to one face of the head 56 at B is a plate 66. Mounted on the outer face of this plate, see FIG. 2, is another plate 68 and the two are secured together by means of the machine screws 70. Formed on the inner face of the rear wall 12 are the bosses 12b and the plate 68 is secured firmly against these bosses by means of the machine screws 72. It is noted that the plane of the faces of the bosses 12b is slightly to the right, FIG. 2, of the rear face of the plate 68 when the screws 72 are loose. However, when these screws are drawn up tight the plates are tilted a bit to the right, and being secured to the head 56 of the coupler 58 that coupler will be tilted in the sleeve 62, and that sleeve will be tilted in the threaded opening 64 sufficiently so that all these parts are in a sense jammed. This provides a self-locking feature, which also provides a good cooling path for the heat from any gas which will be present, should an explosive condition which ignites the gas within the housing occur. It may be noted that when the screws 72 are loosened the sleeve 62 will become relatively free for withdrawal.

Figure 3:
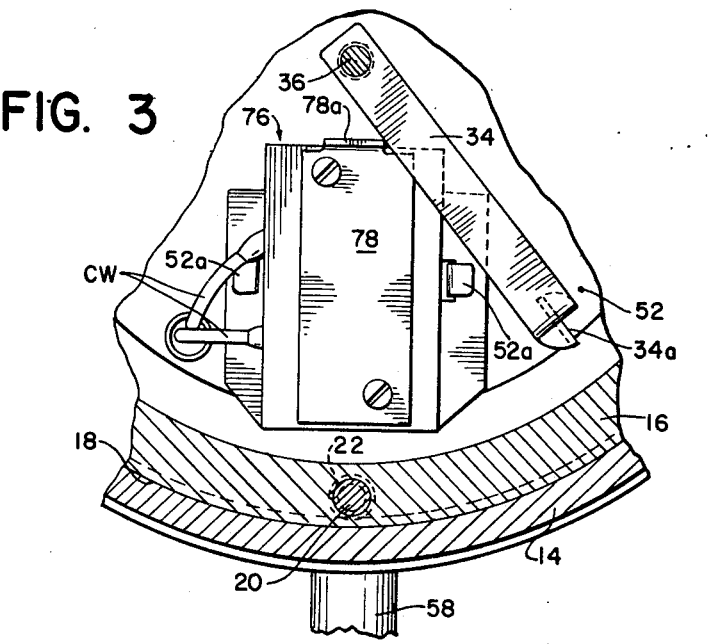
FIGURE 3 is a front elevational view, partly in section, of a detail of construction as it would appear from line 3—3 of FIGURE 2.

Mounted on the face of the dial 52, see FIGS. 2 and 3, is a circuit connection block 76, which is held on the dial by means of tabs 52a struck out from the dial and bent over in apertures on the base of the block assembly. The circuit wires from the mercury switch of the device leading to the block are shown at CW. Mounted on top of this block is a plate 78 which has an upstanding tab 78a, see FIGS. 2 and 3, of such width as to provide a stop for the inactive position of the arm 34. It will be seen that the inactive position for this arm could be either that shown in FIG. 3 or around to the other side of the stop 78a.

The various parts of the operating mechanism as previously mentioned form no part of this invention and so are not further detailed herein.

From the above disclosure it will be apparent that the features of novelty herein disclosed are capable of some variation by those skilled in the art.

What is claimed is:

1. An instrument housing having a front opening through which a dial may be viewed, a crystal seat defined in said housing peripherally surrounding said dial and facing rearwardly from said front opening, a transparent crystal in said housing and mounting means on said housing secured to said crystal at its center, said mounting means including means tightenable against said crystal urging said crystal into seating engagement against said seat whereby a fluid tight seal is effected between said seat and crystal.

2. The combination of claim 1 in which said seat is part of a ring detachable from said housing.

3. The combination of claim 1, in which said seat is part of a ring threadedly mounted on said housing and there is included means for applying pressure between said ring and housing to jam said threads.

4. The combination of claim 2, in which said mounting means comprises a radial arm on said ring and a compression member clamping said crystal between the end of said arm and said member.

5. The combination of claim 4, further comprising an adjustable arm in said housing, means operable through said compression member for operating said adjusting arm and means for locking said last means to prevent unauthorized movement of said adjusting arm.

References Cited

UNITED STATES PATENTS

| | | | |
|---|---|---|---|
| 1,018,582 | 2/1912 | Nelson. | |
| 1,328,941 | 1/1920 | Brewer. | |
| 1,824,781 | 9/1931 | La Bar | 73—431 |
| 2,162,446 | 6/1939 | Scott | 220—57 |
| 2,518,068 | 8/1950 | Rodanet | 73—431 |
| 2,577,492 | 12/1951 | Teter. | |
| 2,641,381 | 6/1953 | Bertrand. | |
| 2,701,964 | 2/1955 | Argabrite | 73—431 X |

LOUIS R. PRINCE, Primary Examiner

D. M. YASICH, Assistant Examiner

U.S. Cl. X.R.

220—46